(12) United States Patent
Kidston et al.

(10) Patent No.: US 7,900,726 B2
(45) Date of Patent: Mar. 8, 2011

(54) METHOD AND SYSTEM FOR HYBRID ENERGY MANAGEMENT CONTROL

(75) Inventors: Kevin S. Kidston, New Hudson, MI (US); Damon R. Frisch, Troy, MI (US); Brian J. Koch, Berkley, MI (US); George T. Stephens, Lake Orion, MI (US); Mario V. Maiorana, Jr., Davisburg, MI (US); Chihsiung Lo, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1074 days.

(21) Appl. No.: 11/411,600

(22) Filed: Apr. 26, 2006

(65) Prior Publication Data

US 2007/0251741 A1 Nov. 1, 2007

(51) Int. Cl.
*B60K 6/28* (2007.10)
*B60W 20/00* (2006.01)
(52) U.S. Cl. ...................................... 180/65.29; 903/930
(58) Field of Classification Search ............... 180/65.21, 180/65.265, 65.275, 65.29; 903/907, 930; 701/48
See application file for complete search history.

(56) References Cited

U.S. PATENT DOCUMENTS

| | | | | |
|---|---|---|---|---|
| 3,719,888 A | * | 3/1973 | Sampey | 324/161 |
| 4,042,056 A | * | 8/1977 | Horwinski | 180/65.25 |
| 4,740,898 A | * | 4/1988 | McKee et al. | 701/70 |
| 5,487,005 A | * | 1/1996 | Genise | 701/36 |
| 5,820,172 A | * | 10/1998 | Brigham et al. | 180/65.29 |
| 6,335,610 B1 | * | 1/2002 | Winstead | 903/903 |
| 6,480,767 B2 | * | 11/2002 | Yamaguchi et al. | 180/65.27 |
| 7,295,902 B2 | * | 11/2007 | Chen et al. | 701/22 |
| 7,328,096 B2 | * | 2/2008 | Amanuma et al. | 701/69 |

* cited by examiner

*Primary Examiner* — Frank B Vanaman
(74) *Attorney, Agent, or Firm* — Ingrassia Fisher & Lorenz, P.C.

(57) ABSTRACT

A charging system for a hybrid vehicle comprises an internal combustion engine, an electric motor generator coupled to the internal combustion engine and operable to be driven as a generator to produce a charging voltage and a battery coupled to the electric motor generator and configured to receive a charge voltage. The charging system further comprises an engine control computer coupled to the internal combustion engine, the electric motor generator and the battery. The engine control computer is configured to determine a threshold for a charging specific fuel consumption (CSFC), calculate an instantaneous CSFC; and initiate active charging of the battery if the instantaneous CSFC is less than or equal to the threshold CSFC.

11 Claims, 3 Drawing Sheets

METHOD AND SYSTEM FOR HYBRID ENERGY MANAGEMENT CONTROL

TECHNICAL FIELD OF THE INVENTION

This invention relates to the field of gas/electric hybrid vehicles and, more specifically, to a method and system for hybrid energy management control.

BACKGROUND OF THE INVENTION

The desire to both increase the gas mileage of vehicles and decrease the amount of pollutants emitted by vehicles has lead led to the development of hybrid electric vehicles (HEVs). HEVs use a combination of an internal combustion engine and an electric motor to power the vehicle. Different types of HEVs exist. Parallel hybrid vehicles use an internal combustion engine in tandem with a battery powered electric motor to propel a vehicle. Serial hybrid vehicles use a battery powered electric motor to propel a vehicle and a secondary power source, such as a fuel cell or internal combustion engine, to recharge the battery. A third type of hybrid vehicle, known as a start/stop hybrid, shuts down the internal combustion engine when the vehicle comes to a stop and utilizes a battery to power the vehicle system. In this configuration, when the vehicle starts to move again the internal combustion engines restarts.

Common to all of these types of hybrids is that the on-board batteries become discharged and, therefore, need to be charged. Typically, there are two different ways to charge the battery. The first way is to use regenerative braking to charge the battery. In regenerative braking, when the electric motor provides braking torque, energy is produced to recharge the battery.

The second way to charge the battery is through the use of active charging. In active charging, the internal combustion engine uses the electric motor as a generator to charge the battery. In order to maximize the efficiency of the HEV, active recharging of the battery should occur at times when the engine is running efficiently. Therefore, there is a need for a method and system for hybrid energy management control.

SUMMARY OF THE INVENTION

In one exemplary embodiment, a charging system for a hybrid vehicle is disclosed. The charging system comprises an internal combustion engine coupled to an electric motor generator, the electric motor generator to be driven as a generator to produce a charging voltage and a battery coupled to the electric motor generator and configured to receive a charge voltage. The charging system further comprises an engine control computer coupled to the internal combustion engine, the electric motor generator and the battery. The engine control computer is configured to determine a threshold CSFC, calculate an instantaneous CSFC, and initiate active charging of the battery if the instantaneous CSFC is less than or equal to the threshold CSFC.

In another exemplary embodiment, a method for optimizing the active charging of a battery in a hybrid vehicle is provided. First, a change in a state of charge of the battery is calculated. Next, a threshold CSFC is determined using, at least in part, the change in the state of charge of the battery and an instantaneous CSFC is determined. Then, the battery is charged if the instantaneous CSFC is less than the threshold CSFC.

BRIEF DESCRIPTION OF THE DRAWINGS

The present invention will hereinafter be described in conjunction with the following drawing figures, wherein like numerals denote like elements, and.

DETAILED DESCRIPTIONS OF THE DRAWINGS

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
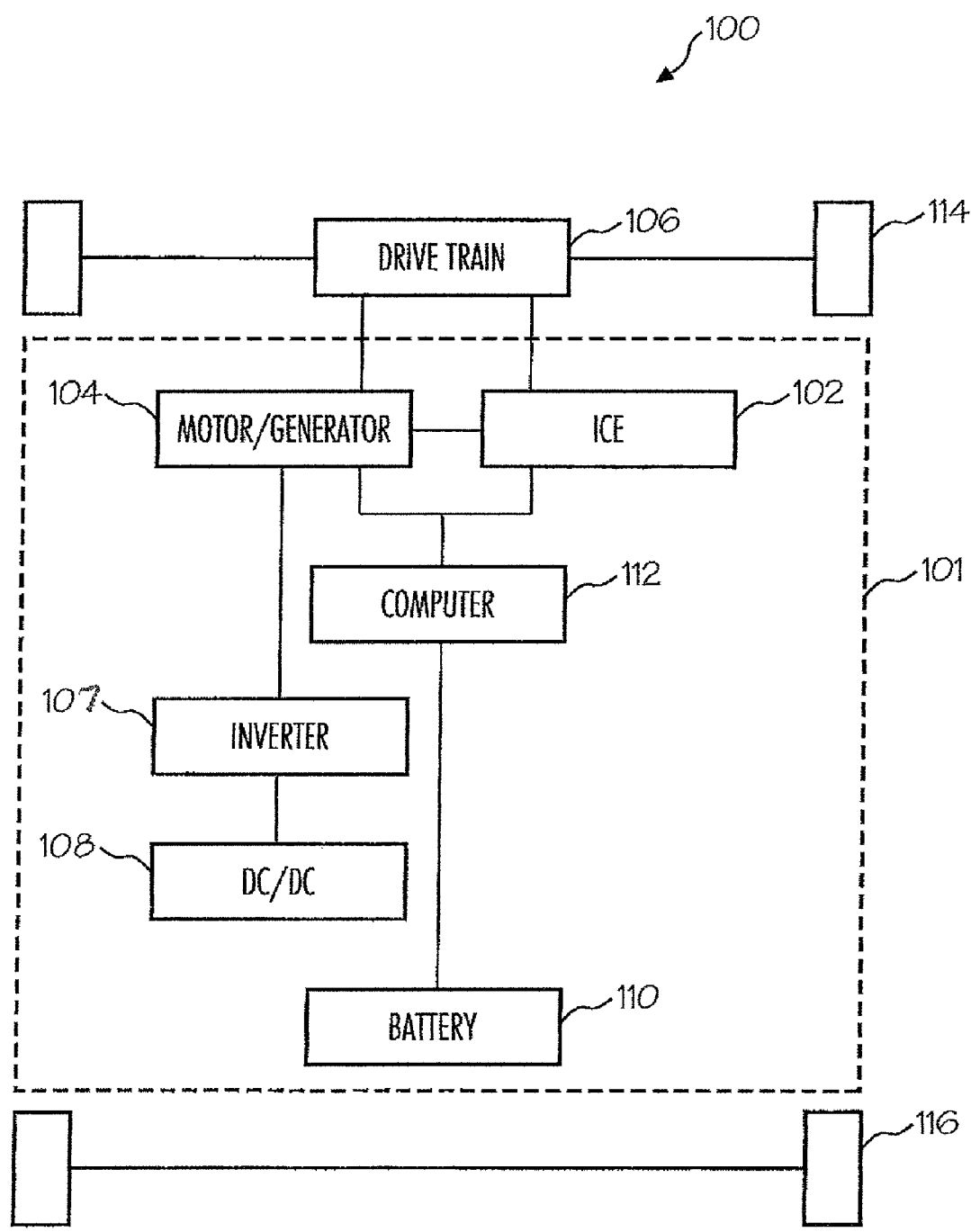
FIG. 1 is a block diagram of an exemplary hybrid vehicle illustrating an exemplary embodiment of a charging system.

FIG. 1 is a block diagram of charging system 101 for an exemplary hybrid vehicle 100 in accordance with the teachings of the present invention. In the exemplary embodiment of FIG. 1, vehicle 100 is illustrated as a parallel hybrid vehicle, although other types of hybrid vehicles such as serial hybrid vehicles and start and stop hybrid vehicles are within the scope of the present invention. Charging system 101 includes an internal combustion engine 102 and an electric motor generator 104 both of which couple to a drive train 106. Electric motor generator 104 couples to the battery 110 via an inverter 107 and a DC-to-DC converter 108. An engine control computer 112 is coupled to the internal combustion engine 102, the electric motor generator 104 and the battery 110.

Electric motor generator 104 is of conventional design. Electric motor generator 104 can function as a motor to propel vehicle 100. Additionally, electric motor generator 104 can operate as a generator to charge battery 110. When operating as a generator to charge the battery, the electric motor generator 104 operates at a certain efficiency which can be represented as $motor_{eff}$. In a typical embodiment, the $motor_{eff}$ is the ratio of the power generated by the electric motor generator to the power provided to generate the power. In FIG. 1, a single electric motor generator 104 is shown coupled to the drive train 106 to power rear wheels 114. Alternatively, the electric motor generator 104 can be coupled to a set of front wheels 116 or both the front and rear wheels. In one exemplary embodiment, a separate electric motor generator is associated with the front wheels and the back wheels. In FIG. 1, the electric motor generator 104 acts as both a motor and a generator. However, in one exemplary embodiment, a separate electric motor and a separate generator can also be provided.

Internal combustion engine 102 is also of conventional design. Internal combustion engine 102 can be used to propel the vehicle 100. Also, when the battery 110 needs to be charged actively, the internal combustion engine 102 operates the electric motor generator 104 as a generator to generate an AC voltage. That AC voltage is converted to a DC voltage by the inverter 107. Inverter 107 can be integrated with the electric motor generator 104 or provided separately.

The generated DC voltage can also be converted, in a typical embodiment, to a higher DC voltage, by use of the DC-to-DC converter 108. In one exemplary embodiment, the DC-to-DC converter 108 converts the DC voltage generated by the electric motor generator 104 into a higher DC voltage needed to charge the battery 110. The DC-to-DC converter 108 can also step down the voltage from the battery when the battery is used to run the electric motor generator 104. When converting the DC voltage, the DC-to-DC converter 108 operates at a certain efficiency, which can be expressed as $DC_{eff}$. In a typical embodiment, $DC_{eff}$ is the ratio of the power input to the DC-to-DC converter 108 and the power produced by the DC-to-DC converter 108.

Engine control computer 112 receives data from various components of the automobile, processes the data and outputs processed data or commands for other vehicular systems. In one embodiment, engine control computer 112 can include non-volatile memory, input/output ports, a central processor, units and communication interfaces for networking with an automotive communication network. In an exemplary embodiment of the present invention, the engine control computer 112 receives data regarding engine efficiency and the state of charge of the battery. Using this information, the engine control computer 112 can then determine the most efficient time to actively charge the battery 110. Engine control computer 112 is of conventional design. In one exemplary embodiment, the engine control computer 112 can be the engine control module (ECM) manufactured by General Motors Corporation of Detroit, Mich.

Battery 110, in one embodiment comprises a large number of low voltage batteries connected in series to form a high voltage battery pack. In one embodiment, the battery 110 is a lead acid (PbA) battery, although other battery chemistries are within the scope of the present invention.

Figure 2:
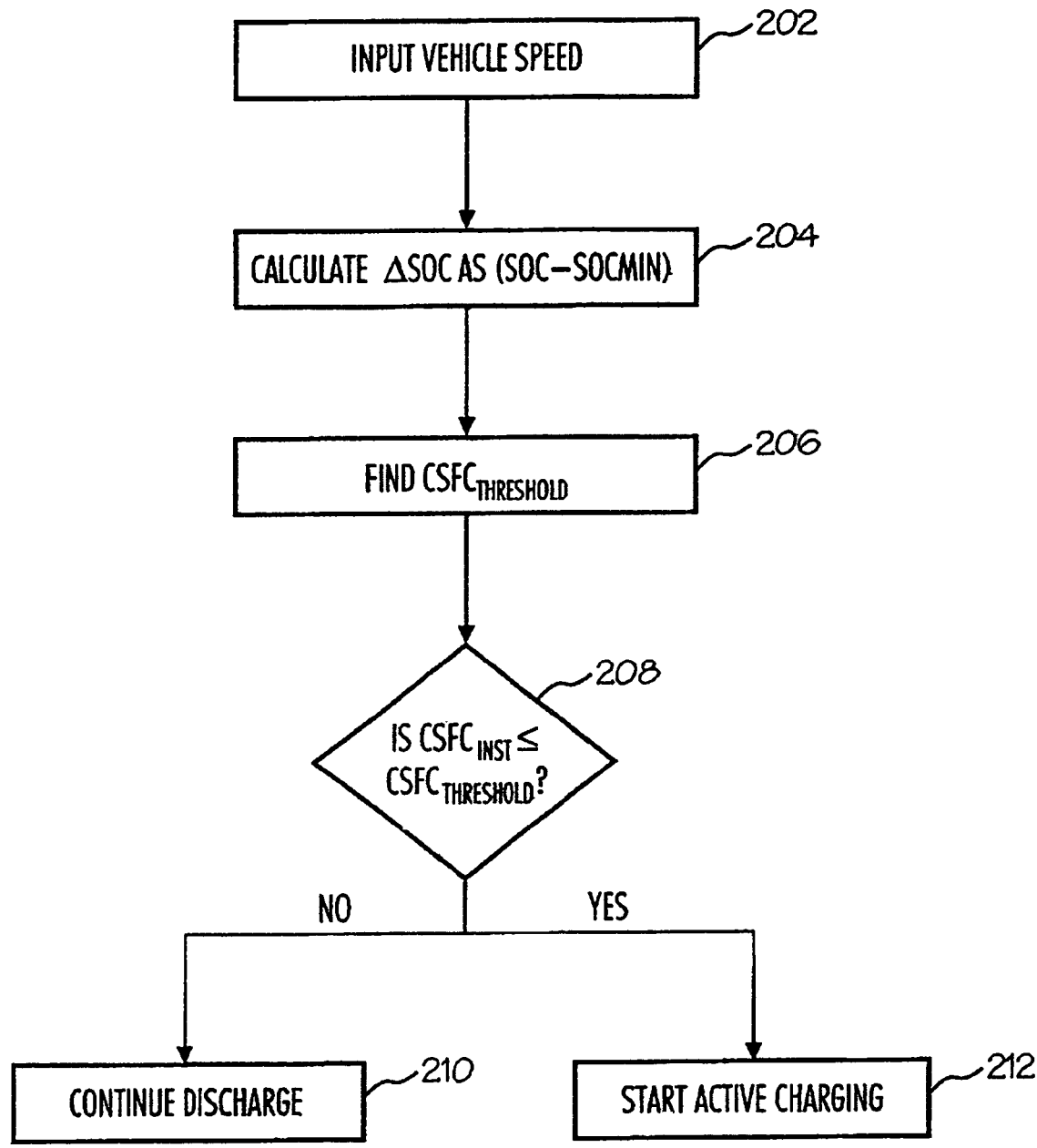
FIG. 2 is a flowchart of an exemplary embodiment of a method to provide energy management for a hybrid vehicle.

A method for determining the best time to actively charge the battery 110 is illustrated in FIG. 2. In general, the initiation of active charging is preferred when the internal combustion engine and other components are operating at a high efficiency level. Other factors, such as the state of charge of the battery 110, influence the active charging decision.

In a first step, step 202, the current vehicle speed is received by engine control computer 112. Next, in step 204, a delta state of charge (ΔSOC) is calculated. The ΔSOC is the difference between the present state of charge of the battery and a minimum state of charge. Typically, the state of charge is expressed as a percentage of a fully charged battery. The minimum state of charge is typically defined as the lowest state of charge that the battery can be at while still providing all vehicle electrical demands. The present state of charge can be received by the engine control computer 112 from a sensor associated with the battery 110.

Figure 3:
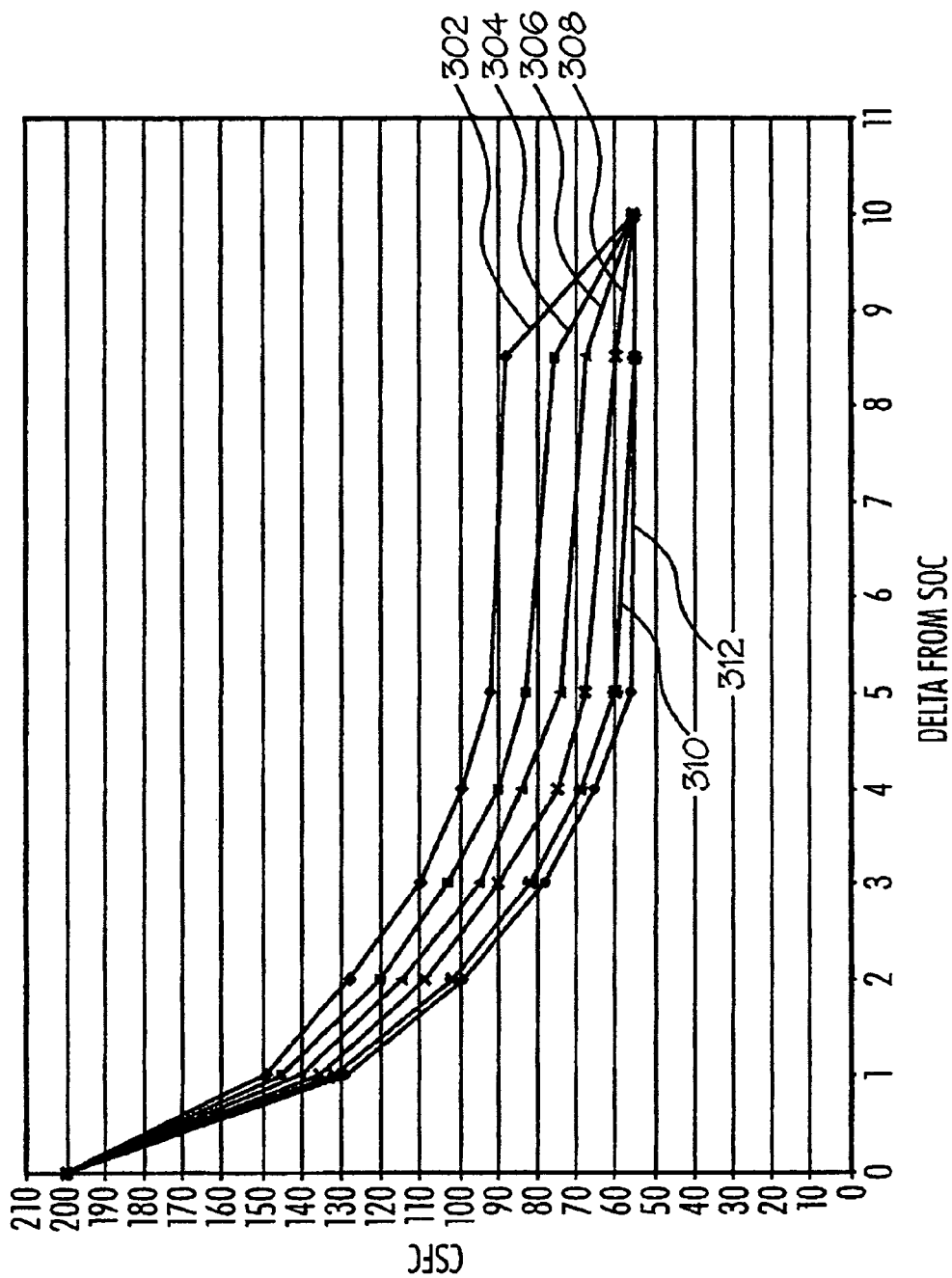
FIG. 3 is a graph of the change of state of charge versus specific fuel consumption threshold for various vehicle speeds.

Next, in step 206, the ΔSOC and the vehicle speed are used to determine a charging specific fuel consumption threshold ($CSFC_{Threshold}$). The CSFC is a measure of the efficiency of the internal combustion engine and the charging system used in active charging. The lower the CSFC the more efficiently the vehicle is operating. The CSFC threshold is a cutoff that the vehicle must fall below before the initiation of active charging. Note that when a vehicle falls below the $CSFC_{Threshold}$, it is operating at a more efficient level than the level represented by the $CSFC_{Threshold}$. The $CSFC_{Threshold}$, in one exemplary embodiment, can be determined by using a look-up table or graph representing the $CSFC_{Threshold}$ for a given speed and ΔSOC. An exemplary graph 300 for $CSFC_{Threshold}$ versus ΔSOC for various vehicle speeds is shown in FIG. 3. For example, in FIG. 3, a 0 kph curve 302, a 30 kph curve 304, a 50 kph curve 306, a 60 kph curve 308 an 80 kph curve 310 and a 150 kph curve are illustrated. Each curve represents the $CSFC_{Threshold}$ as a function of the ΔSOC for a given vehicular speed. For example, the 50 kph curve 306 illustrates the $CSFC_{Threshold}$ value for a given ΔSOC. As an example, if the vehicular speed is 50 kph and the ΔSOC is 5, the $CSFC_{Threshold}$ is approximately 95.

Note that as the vehicular speed increases the ΔSOC versus $CSFC_{Threshold}$ curve shifts, for most data points on the curves, downward. As vehicle speed increases, the amount of regenerative charging available when braking initiates increases. Therefore, the need to actively charge the battery is reduced. Thus, as vehicle speed for a given ΔSOC increases, the $CSFC_{Threshold}$ drops, indicating that the vehicle's operating efficiency must increase before active charging can be initiated.

Additionally, as can be seen in FIG. 3, as the ΔSOC increases for a given vehicular speed, the $CSFC_{Threshold}$ decreases. This reflects the fact that as the present state of charge gets further away from the minimum state of charge, the need to charge the battery decreases. Conversely, as the ΔSOC decreases the present SOC becomes close to the minimum SOC necessitating the active charging of the battery.

Also, as seen in FIG. 3, each curve stops at a ΔSOC of ten percent. This is because when the present state of charge is much greater than the minimum state of charge, active charging is not a priority because active charging can be started later when the ΔSOC has decreased. Of course, in FIG. 3, a ΔSOC of ten percent is used for exemplary purposes only. The margin between the present state of charge and the minimum state of charge at which initiation of active charging is prevented can be set at differing amounts without departing from the scope of the present invention.

Next, in step 208, it is determined if an instantaneous CSFC is less than or equal to the CSFC threshold. The instantaneous CSFC ($CSFC_{inst}$), which represents the present CSFC, is calculated by first determining a current brake specific fuel consumption (BSFC). The BSFC is a measure of engine efficiency and is expressed in terms of micrograms of fuel burned per joule of energy produced. The larger the BSFC, the less efficient the engine operation. The BSFC can be computed by the engine control computer 112 from data collected by engine sensors associated with internal combustion engine 102. Once the BSFC is determined, the $CSFC_{inst}$ can be determined by dividing the BSFC by a measurement of the charging system efficiency, which, in one embodiment, can be expressed as the product of the motor generator efficiency ($Motor_{eff}$) and the DC to DC conversion efficiency ($DC_{eff}$).

$$CSCF_{inst} = \frac{BSCF}{(motor_{eff} * DC_{eff})}$$

If the $CSFC_{inst}$ exceeds the $CSFC_{Threshold}$ then, in step 210, no active charging is done. If the $CSFC_{inst}$ is less than the $CSFC_{Threshold}$, active charging is started in step 212. The active charging will continue until the instantaneous CSCF exceeds the $CSFC_{inst}$ by a predetermined amount. This is to prevent the charging system 101 from cycling between charging and discharging as the instantaneous CSFC varies between just greater than the $CSFC_{Threshold}$ and just less than the $CSFC_{Threshold}$.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A charging system for a hybrid vehicle comprising:
   an internal combustion engine;
   an electric motor generator operable to be driven as a generator to produce a charging voltage;
   a battery coupled to the electric motor generator and configured to receive a charge voltage; and
   an engine control computer coupled to the internal combustion engine, the electric motor generator and the battery, the engine control computer configured to:
   determine a threshold for a charging specific fuel consumption (CSFC) value by:
   determining a current vehicle speed; and
   calculating the threshold CSFC value using a change in a state of charge and the vehicle speed;
   calculate an instantaneous CSFC value; and
   initiate active charging if the instantaneous CSFC value is less than or equal to the threshold CSFC.

2. The system of claim 1, wherein the engine control computer is further configured to determine a change in the state of charge by:
   determining a present state of charge; and
   calculating the change in the state of charge by subtracting a present state of charge from a minimal state of charge.

3. The system of claim 1, wherein the engine control computer is further configured to charge the battery until the instantaneous CSFC value exceeds the threshold CSFC value by a predetermined amount.

4. The system of claim 1 the, wherein the engine control computer is further configured to prevent active charging if the change in the state of charge exceeds a fixed amount.

5. The system of claim 1, wherein the hybrid vehicle is a parallel hybrid vehicle.

6. The system of claim 1, wherein the hybrid vehicle is a serial hybrid vehicle.

7. The system of claim 1, wherein the hybrid vehicle is a start-stop hybrid vehicle.

8. A charging system for a hybrid vehicle comprising:
   an internal combustion engine;
   an electric motor generator operable to be driven as a generator to produce a charging voltage;
   a battery coupled to the electric motor generator and configured to receive a charging voltage; and
   an engine control computer coupled to the internal combustion engine, the electric motor generator and the battery, the engine control computer configured to:
   determine a threshold for a charging specific fuel consumption (CSFC) value,
   calculate an instantaneous CSFC value by dividing a brake specific fuel consumption value by the product of a motor generator efficiency value and a DC-to-DC converter efficiency value; and
   initiate active charging if the instantaneous CSFC value is less than or equal to the threshold CSFC value.

9. The system of claim 8, wherein the engine control computer is further configured to determine a change in a state of charge by:
   determining a present state of charge; and
   calculating the change in the state of charge by subtracting a present state of charge from a minimal state of charge.

10. The system of claim 8, wherein the engine control computer is further configured to charge the battery until the instantaneous CSFC value exceeds the threshold CSFC value by a predetermined amount.

11. The system of claim 9, wherein the engine control computer is further configured to prevent active charging if the change in the state of charge exceeds a fixed amount.

* * * * *